(12) United States Patent
Chapman

(10) Patent No.: US 12,154,186 B2
(45) Date of Patent: Nov. 26, 2024

(54) METHODS, SYSTEMS, AND DEVICES FOR RENDERING A WATERMARK WITH NEAR PERFECT INFRARED COLORS

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 481 days.

(21) Appl. No.: 17/500,321

(22) Filed: Oct. 13, 2021

(65) Prior Publication Data

US 2023/0109676 A1 Apr. 13, 2023

(51) Int. Cl.
*H04N 5/33* (2023.01)
*G01J 5/00* (2022.01)
*G06T 1/00* (2006.01)

(52) U.S. Cl.
CPC .............. *G06T 1/0028* (2013.01); *G01J 5/00* (2013.01); *G06T 1/0021* (2013.01); *G06T 1/0042* (2013.01); *H04N 5/33* (2013.01); *G01J 2005/0077* (2013.01)

(58) Field of Classification Search
CPC ... G06T 1/0028; G06T 1/0021; G06T 1/0042; G01J 5/00; G01J 2005/0077; H04N 5/33; H04N 1/32309
See application file for complete search history.

(56) References Cited

U.S. PATENT DOCUMENTS

| | | |
|---|---|---|
| 9,781,294 B1 | 10/2017 | Chapman |
| 10,051,156 B2 | 8/2018 | Chapman et al. |
| 10,313,556 B1 | 6/2019 | Chapman |
| 10,805,494 B1 | 10/2020 | Chapman |
| 11,082,640 B2 | 8/2021 | Nagata et al. |
| 2011/0127331 A1* | 6/2011 | Zhao ........................ G06K 7/12 235/494 |

(Continued)

OTHER PUBLICATIONS

"CIELAB color space", Wikipedia, Retrieved from "https://en.wikipedia.org/w/index.php?title=CIELAB_color_space&oldid=1045708145", page last edited on Sep. 22, 2021, at 01:02 (UTC).

(Continued)

*Primary Examiner* — Juan M Guillermety
(74) *Attorney, Agent, or Firm* — Ortiz & Lopez, PLLC; Kermit D. Lopez; Luis M. Ortiz

(57) ABSTRACT

A method and system for rendering a watermark with near perfect infrared colors can involve providing an infrared pattern ink having a color with a lower spectral reflectance in an infrared spectrum, replacing the color having the lower spectral reflectance with a replacement color constituting a combination of colors having a higher spectral reflectance in the infrared spectrum, them matching in a visible spectrum, the replacement color with the color having the lower spectral reflectance in the infrared spectrum, and rendering a watermark as a metameric color pair including the infrared pattern ink and replacement color. Alternatively, a watermark may be created by defining a first color pattern having a CMYK value derived from a particular LAB value with a lower toner stack and a higher reflectance in an infrared spectrum as compared to a second color pattern having a second CMYK value derived from the same LAB value.

12 Claims, 13 Drawing Sheets

(56) References Cited

U.S. PATENT DOCUMENTS

2012/0218608 A1* 8/2012 Maltz ................. H04N 1/32309
                                                        358/3.28
2014/0002558 A1   1/2014 Ramesh et al.
2020/0336623 A1* 10/2020 Chapman .............. G06T 1/0021

OTHER PUBLICATIONS

"RGB color model", Wikipedia, Retrieved from "https://en.wikipedia.org/w/index.php?title=RGB_color_model&oldid=1046242091", page was last edited on Sep. 24, 2021, at 16:56 (UTC).

"Thermographic camera", Retrieved from "https://en.wikipedia.org/w/index.php?title=Thermographic_camera&oldid=1022740066", page was last edited on May 12, 2021, at 06:29 (UTC).

"Specialty Imaging, Fraud-Resistant Effects That Protect Your Most Sensitive Documents", Xerox Corporation, 2019.

* cited by examiner

METHODS, SYSTEMS, AND DEVICES FOR RENDERING A WATERMARK WITH NEAR PERFECT INFRARED COLORS

TECHNICAL FIELD

Embodiments are related to image processing methods, systems and devices. Embodiments also relate to printing devices and techniques. Embodiments further relate to security features such as watermarks. Embodiments are further related to specialty imaging. Embodiments additionally to techniques and devices for rendering near perfect infrared (IR) colors. Embodiments also relate to methods and systems for rendering dual microgloss and infrared effects in the same space.

BACKGROUND

In conventional printing processes that require security measures, a pattern color space having specialty imaging characteristics has been utilized to provide the security measures and prevent counterfeiting of printed materials. Furthermore, in conventional printing processes, a pattern color space has been utilized, in part on variable data, such as printing logos, serial numbers, seat locations, or other types of unique identifying information on printed materials.

Security is an important requirement in many document production applications. In situations such as official or government document printing, event ticket printing, financial instrument printing and the like, many documents must be protected against copying, forging and/or counterfeiting. To accomplish this, printed documents often include security marks or security features that serve to prevent counterfeiting and/or identify a document as original.

Thus, in security applications, it may be desirable to add information to a document in the form of a security mark or a security feature that may prevent or hinder alterations and counterfeiting. Specialty imaging has been used, conventionally, in printed materials to provide fraud protection and anti-counterfeiting measures for such security applications. Some examples are in prescriptions, contracts, documents, coupons, and tickets. Typically, several specialty-imaging techniques are used at various positions in a document. In addition, these security elements may in some cases conflict with the overall aesthetics of the document.

Examples of specialty imaging include, but are not limited to, features such as the Xerox® MicroText Mark, Xerox® Correlation Mark, Xerox® GlossMark®, Xerox® Infrared Mark and Xerox® Fluorescent Mark, which add security to static and variable information (VI) jobs by making it difficult to counterfeit them. Using multiple effects—including visible ones—on an application makes reproducing it more costly than purchasing the original. Specialty imaging can also be used to add visual interest and sophistication to print jobs. Specialty imaging may also be used to add reflective text to enhance photos, illustrations and colored backgrounds.

In the area of security printing, documents can be protected from copying, forging and counterfeiting using multiple techniques. Specialty imaging is one such method for security printing, which can use standard material such as papers inks and toners. Typically, security printing companies in the marketplace require special (expensive) materials. An example documents is a prescription where a pharmacist would like to be able to have a good level of confidence that the document is genuine.

One well known example is the specialty imaging infrared (IR) text where a hidden message may only be seen under IR illumination with, for example, an IR camera. This can take advantage of toner spectral reflectance. FIG. 1 illustrates a prior art graph 10 displaying plotted data (curves) indicating that black toner can absorb IR while CMY reflects in the IR spectrum. Reflectance is noted with respect to the y-axis of graph 10, while wavelength WL in cm is depicted in graph 10 with respect to the x-axis. This effect can be accomplished without special (expensive) materials such as infrared ink.

FIG. 2 and FIG. 3 illustrate a prior art image (i.e., the same image) at different zoom levels showing a metameric pair of pattern inks. That is, an image 12 is shown in FIG. 2 and an image 14 is shown in FIG. 3. Image 12 and image 14 are the same image, albeit at different zoom levels. One ink used for the text box can be composed of red, blue, cyan, and magenta. The text ink can be composed of magenta, blue and black. At near printed levels, such as shown in the example image 12 of FIG. 2, the pair of inks can blend into a single pattern/color. This situation may occur as shown in FIG. 2, but not always when printed. The image 14 illustrated in FIG. 3 relates to a situation that allows the text "X" to be viewed due to the zoom level.

A variety of named colors may be available so that a document designer can insert the IR pattern inks that are most useful in the documents overall design. The example shown in FIG. 2 and FIG. 3 is IR_crimson_007. FIG. 4 illustrates an image 16 depicting a swatch sheet 17 displaying the current IR colors with readable text without an IR camera. These swatches are failures. Note, however, that zooming may help with viewing the text.

Specialty imaging infrared (IR) colors thus must be nearly invisible under office lighting and clearly visible with an IR camera in order to be considered working colors. A swatch sheet may be printed and swatches that fail either case above are typically thrown out. Not being nearly invisible under office lighting is the most common failure. The metameric pair of IR pattern inks should appear around the same under office lighting due to a technique similar to the way halftoning works. They should appear different with an IR camera due to spectral reflectance differences in the toners/inks.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the embodiments to provide for improved image processing methods, systems and devices.

It is another aspect of the embodiments to provide for improved printing devices and techniques, and improved security features such as watermarks.

It is further aspect of the embodiments to provide for improved specialty imaging techniques.

It is also an aspect of the embodiments to provide methods and systems for implementing near perfect IR colors, in accordance with an embodiment.

It is yet another aspect of the embodiments to provide methods and systems for implementing a dual microgloss and infrared effects in the same space.

The aforementioned aspects and other objectives and advantages can now be achieved as described herein. In an embodiment, a method of rendering a watermark with near perfect infrared colors, can involve: providing an infrared pattern ink having a color with a lower spectral reflectance in an infrared spectrum; replacing the color having the lower spectral reflectance in the infrared spectrum with a replacement color comprising a combination of colors having a higher spectral reflectance in the infrared spectrum; matching in a visible spectrum, the replacement color with the color having the lower spectral reflectance in the infrared spectrum; and rendering a watermark comprising a metameric color pair that includes the infrared pattern ink and the replacement color.

In an embodiment, the metameric color pair can comprise a pair of metameric pattern inks.

In an embodiment, the metameric color pair can exhibit a visible signal with an infrared camera.

In an embodiment, the watermark can be rendered by a printing system.

In an embodiment, the processor can comprise a digital front-end controller.

In another embodiment, a method for rendering imaging effects on a same space on a recording medium, can involve: defining with a processor, a first color pattern having a CMYK value derived from a particular LAB value with a lower toner stack and a higher reflectance in an infrared spectrum as compared to a second color pattern having a second CMYK value derived from the same LAB value; and rendering at a small size the first color pattern and the second color pattern on a recording medium, wherein the first color pattern and the second color pattern appear as a single LAB color in a same space on the recording medium.

In an embodiment, the first color pattern can comprise at least one of: a microgloss effect or an IR effect.

In an embodiment, the second color pattern can comprise at least one of: a microgloss effect or an IR effect.

In an embodiment, the first color pattern can comprise a microgloss effect and the second color pattern comprises an IR effect.

In an embodiment, the first color pattern can comprise an IR effect and the second color pattern comprises a microgloss effect.

In an embodiment, a watermark can include the first color pattern and the second color pattern rendered on the recording medium.

In an embodiment, the first color pattern and the second color pattern can be rendered on a recording medium by a printing system.

In an embodiment, the processor can comprise a digital front-end controller.

In an embodiment, a printing system for rendering a watermark with near perfect infrared colors, can comprise a processor adapted to: provide an infrared pattern ink having a color with a lower spectral reflectance in an infrared spectrum; replace the color having the lower spectral reflectance in the infrared spectrum with a replacement color comprising a combination of colors having a higher spectral reflectance in the infrared spectrum; and match in a visible spectrum, the replacement color with the color having the lower spectral reflectance in the infrared spectrum.

An embodiment of the printing system can further include a printer that renders a watermark comprising a metameric color pair that includes the infrared pattern ink and the replacement color.

In an embodiment of the printing system, the metameric color pair can comprise a pair of metameric pattern inks.

In an embodiment of the printing system, the metameric color pair can exhibit a visible signal with an infrared camera.

In an embodiment of the printing system, the processor can comprise a digital front-end controller.

In another embodiment, a printing system for rendering imaging effects on a same space on a recording medium, can include a processor adapted to: define a first color pattern having a CMYK value lower than that of an LAB value with a lower toner stack and a high reflectance in an infrared spectrum; define a second color pattern having a CMYK value higher than that of an LAB value with a higher toner stack and a low reflectance in the IR spectrum; and render at a small size the first color pattern and the second color pattern on a recording medium, wherein the first color pattern and the second color pattern appear as a single LAB color in a same space on the recording medium.

In an embodiment of the printing system, the first color pattern can comprise at least one of: a microgloss effect or an IR effect.

In an embodiment of the printing system, the second color pattern can comprise at least one of: a microgloss effect or an IR effect.

In an embodiment of the printing system, the first color pattern can comprise a microgloss effect and the second color pattern comprises an IR effect.

In an embodiment of the printing system, the first color pattern can comprise an IR effect and the second color pattern comprises a microgloss effect.

In an embodiment of the printing system, a watermark can include the first color pattern and the second color pattern rendered on the recording medium.

In an embodiment of the printing system, the first color pattern and the second color pattern can be rendered on a recording medium by a printing system.

In an embodiment of the printing system, the aforementioned process comprise a digital front-end controller.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
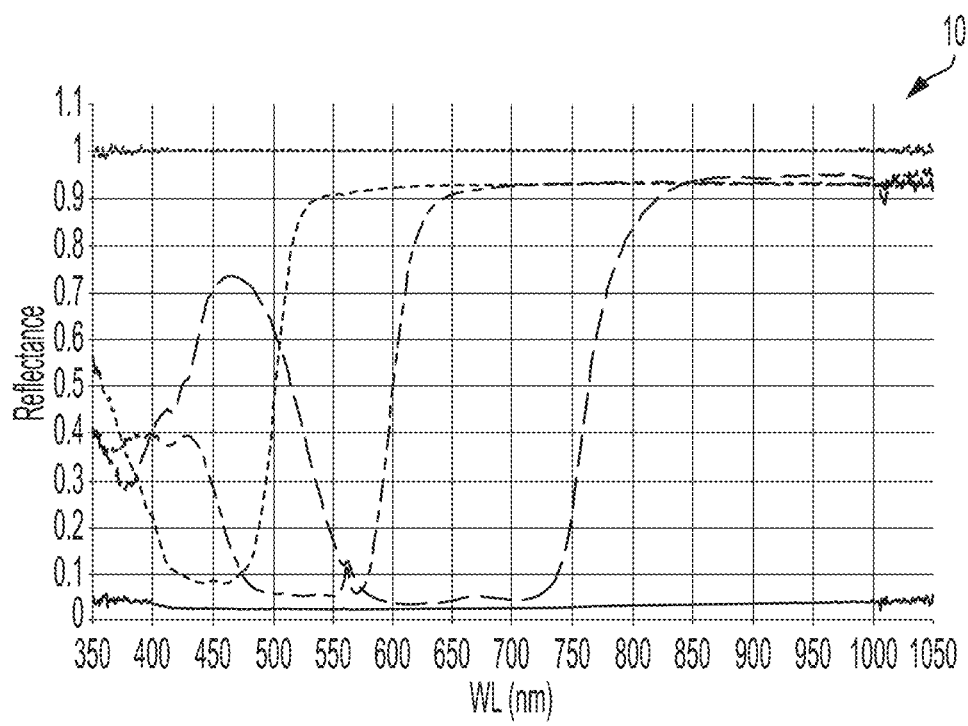
FIG. 1 illustrates a prior art graph with data plotted indicating that black toner absorbs IR while CMY reflect in the IR spectrum.
Figure 2:
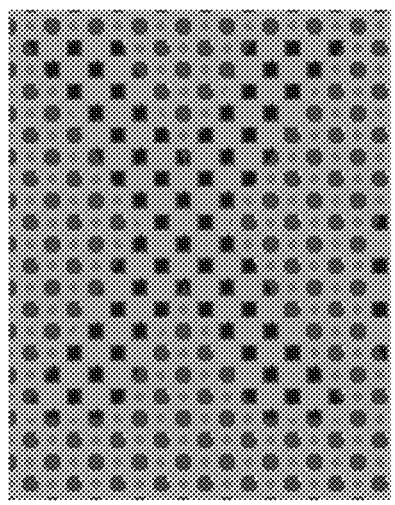
FIG. 2 and FIG. 3 illustrate a prior art image (i.e., the same image) at different zoom levels showing a metameric pair of pattern inks.
Figure 3:
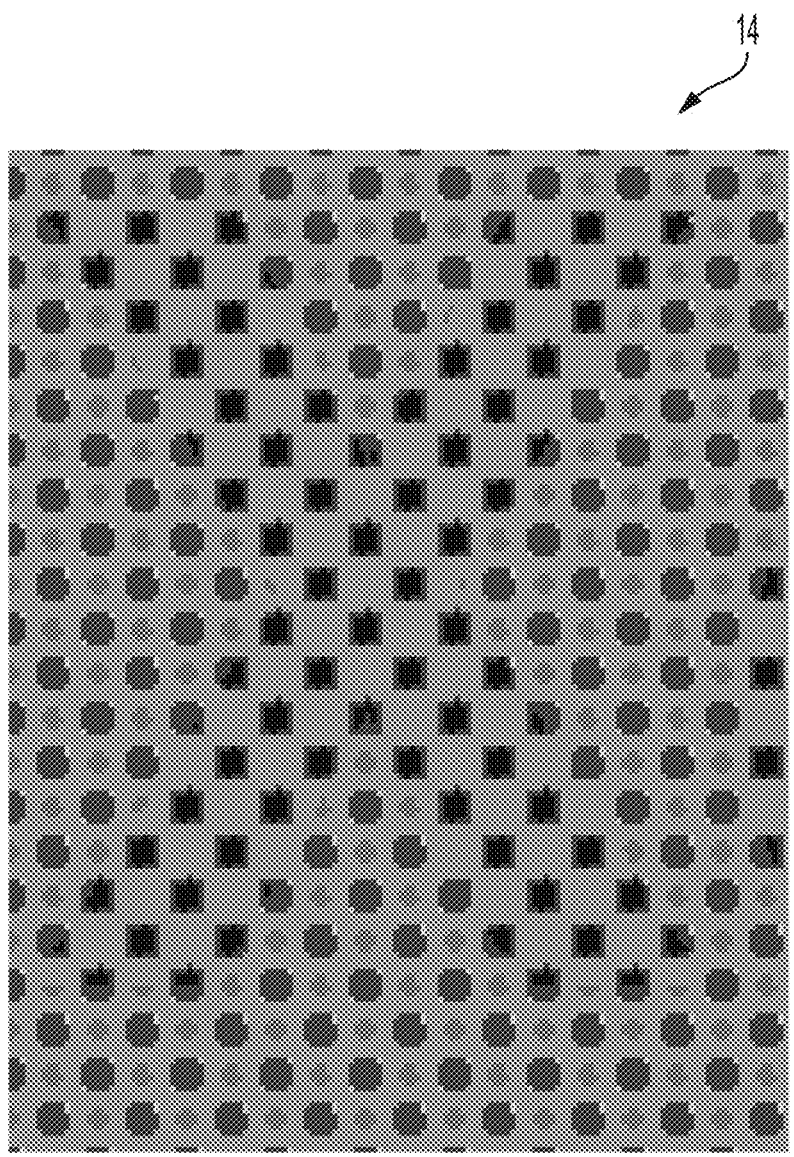
Figure 4:
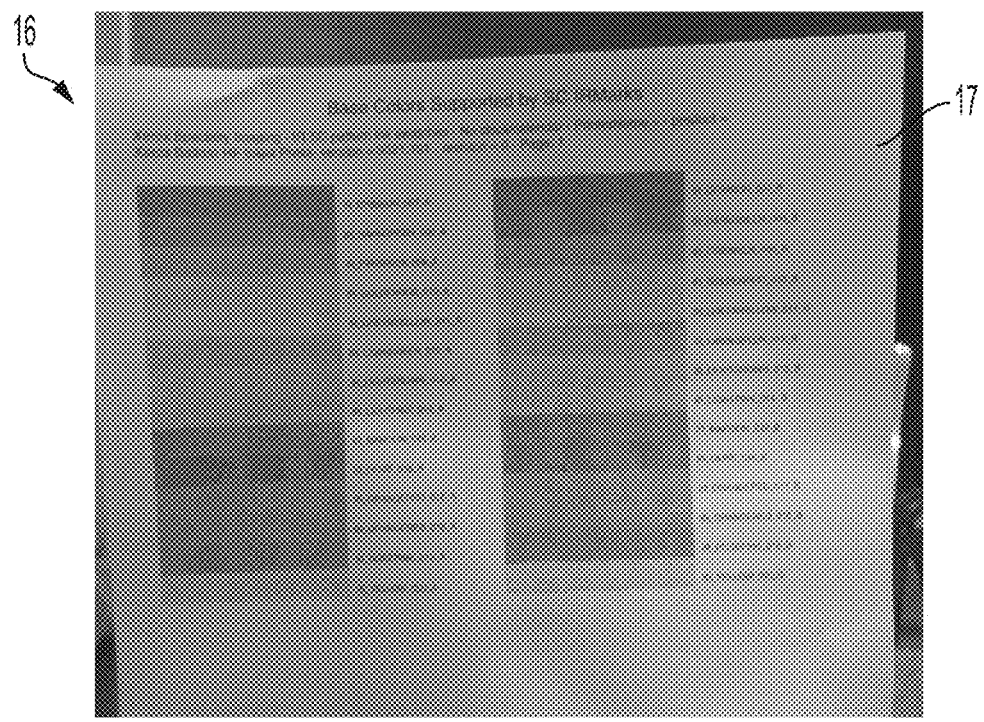
FIG. 4 illustrates prior art IR colors with readable text without an IR camera.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "data" refers herein to physical signals that indicate or include information. An "image," as a pattern of physical light or a collection of data representing the physical light, may include characters, words, and text as well as other features such as graphics.

A "digital image" is by extension an image represented by a collection of digital data. An image may be divided into "segments," each of which is itself an image. A segment of an image may be of any size up to and including the whole image.

The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An operation can perform "image processing" when it operates on an item of data that relates to part of an image.

"Contrast" is used to denote the visual difference between items, data points, and the like. It can be measured as a color difference or as a luminance difference or both.

A digital color printing system is an apparatus arrangement suited to accepting image data and rendering that image data upon a substrate, such as, for example, a recording medium. The term 'IR camera' or 'infrared camera' as utilized herein refers to a type of thermographic camera can create an image using infrared (IR) radiation. The term 'infrared' (also referred to sometimes as 'infrared light') can relate to electromagnetic radiation with wavelengths longer than those of visible light. It is therefore invisible to the human eye. IR is generally understood to encompass wavelengths from the nominal red edge of the visible spectrum around 700 nanometers, to 1 millimeter.

The "RGB color model" is an additive color model in which red, green, and blue can be added together in various ways to reproduce a broad array of colors. The name of the model comes from the initials of the three additive primary colors, red, green, and blue.

A primary purpose of the RGB color model is for the sensing, representation, and display of images in electronic systems. RGB is a device-dependent color model: different devices detect or reproduce a given RGB value differently, since the color elements and their response to the individual R, G, and B levels vary from manufacturer to manufacturer, or even in the same device over time. Thus, an RGB value does not define the same color across devices without some kind of color management.

The "CMYK color model" is a subtractive color model, which can be used in color printing, and can also be used to describe the printing process itself. CMYK refers to the four inks used in some color printing: cyan, magenta, yellow, and black.

"Colorant" can refer to one of the fundamental subtractive C, M, Y, K, primaries, which may be realized in formulation as, liquid ink, solid ink, dye, or electrostatographic toner. A "colorant mixture" is a particular combination of C, M, Y, K colorants.

The term 'LAB' as utilized refer can relate to the CIELAB color space (also referred to as L*a*b*), which is a color space defined by the International Commission on Illumination in 1976. It expresses color as three values: L* for perceptual lightness, and a* and b* for the four unique colors of human vision: red, green, blue, and yellow. The term 'LAB' can be utilized interchangeably with L*a*b*.

An "infrared mark" is a watermark embedded in the image that has the property of being relatively indecipherable under normal light, and yet decipherable under infrared illumination by appropriate infrared sensing devices, such as infrared cameras.

"Metameric" rendering/printing is the ability to use multiple colorant combinations to render a single visual color, as can be achieved when printing with more than three colorants.

The word "printer" and the term "printing system" as used herein can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine, and which may perform a print outputting function for any purpose. A digital color printing system is an example of a printer or printing system.

In an embodiment, a pattern ink from the original metameric pair that is more absorbent in the IR spectrum can be left unchanged. A second pattern ink can be created from the first pattern ink replacing highly IR absorbent colors with highly reflective IR colors. The new pair of metameric pattern inks now appear almost identical under office lighting while still exhibiting a clearly visible signal with an IR camera. More of the swatch sheet is typically now usable. The new set of colors can be a direct replacement for the originals.

In an embodiment, a method can be implemented as follows:
1) Start with the current IR pattern ink with lower spectral reflectance in the IR spectrum;
2) Replace only the color(s) with lower spectral reflectance in the IR spectrum with a combination of the colors with higher spectral reflectance in the IR spectrum;
3) The replacement colors of step 2 should try and match the replaced color of step 1 in the visible spectrum;
4) Use the new metameric pair configured from the IR pattern ink from step 1 with the new pattern ink from steps 2 and 3.

The result of the steps/operations above is that the new pattern ink in Steps 2 and 3 and the one chosen in Step 1 become the new IR colors. The original IR pattern ink not chosen in Step 1 is no longer used. The method outlined above with respect to step 1, step 2, step 3, and step 4 is also described herein with respect to the embodiment shown in FIG. 13. Note that the method described above and elsewhere herein can be implemented by a printing system such as the printing system shown 100 shown in FIG. 16.

Figure 5:
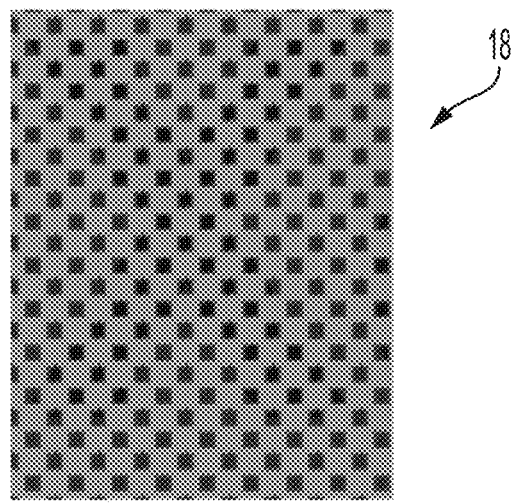
FIG. 5 and FIG. 6 illustrate images of a new metameric pair of pattern inks that are a direct replacement for the original pattern inks, in accordance with an embodiment.
Figure 6:
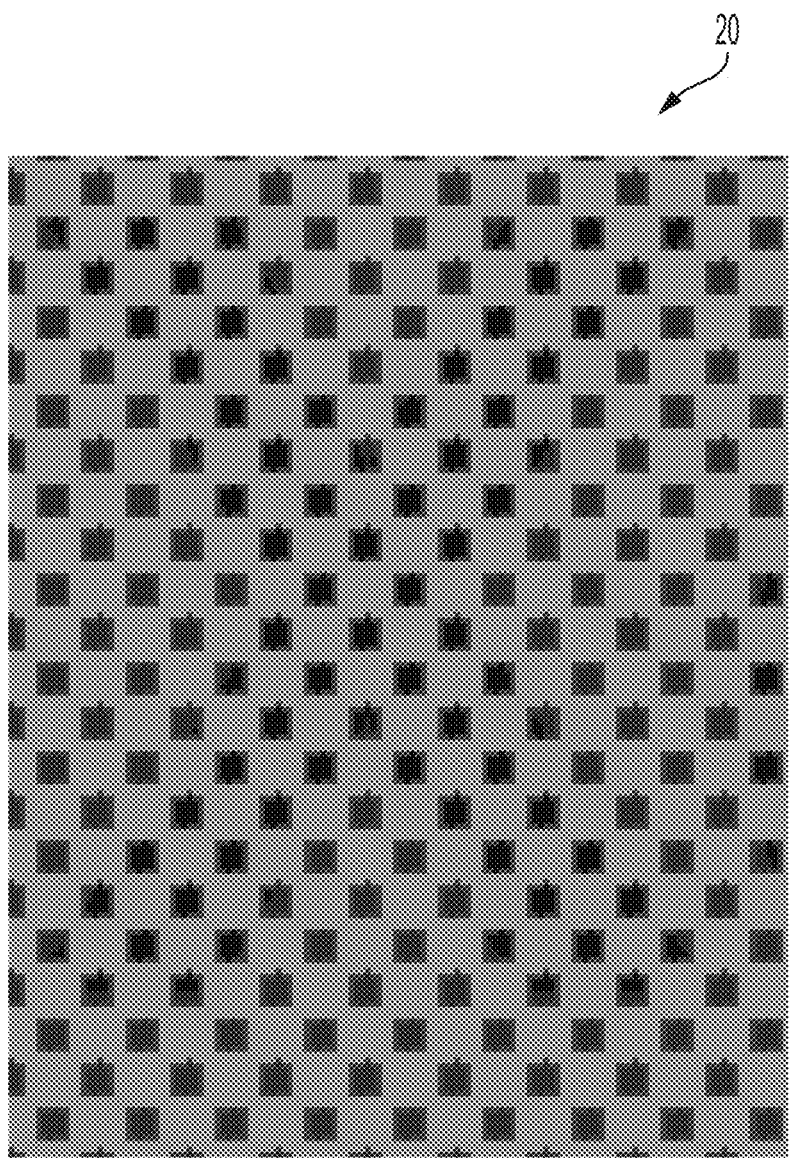

FIG. 5 and FIG. 6 illustrate a new metameric pair of pattern inks (e.g., IR_crimson_007 metameric pair of pattern inks) as shown in respective image 18 and image 20, which can be used as a direct replacement for the original pattern inks. This offers the advantage of replacing the current IR colors with the improved IR colors without changes for the document designer. In the example embodiment of image 18 and image 20 depicted in FIG. 5 and FIG. 6, the color with the least spectral reflectance in the IR spectrum K can be replaced with colors with more spectral reflectance in the IR spectrum process.

Figure 7:
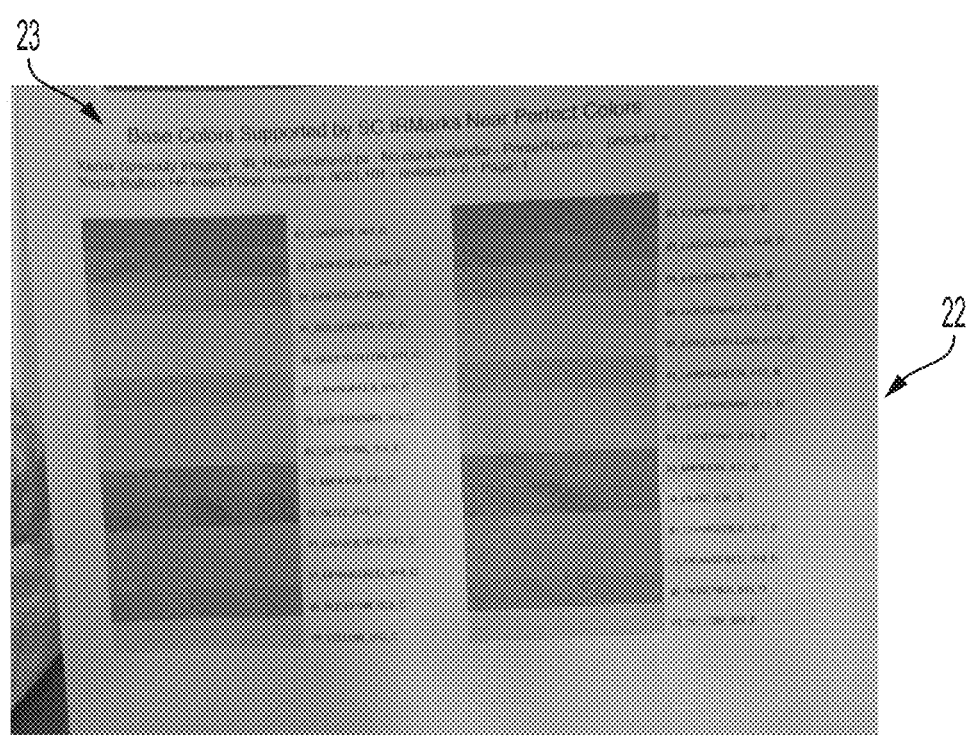
FIG. 7 illustrates an image of an IR swatch sheet, which may be unreadable without an IR camera, in accordance with an embodiment.
Figure 8:
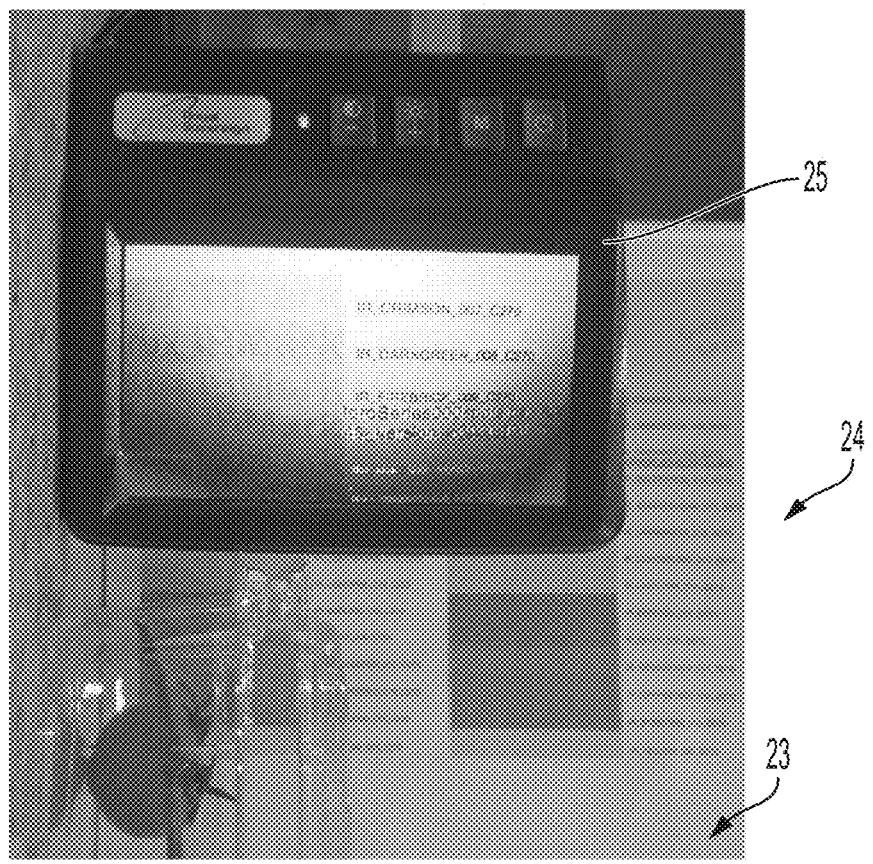
FIG. 8 illustrates an image of the IR swatch sheet shown in FIG. 7, but readable with an IR camera, in accordance with an embodiment.

FIG. 7 illustrates an image 22 of an IR swatch sheet 23, which may be unreadable without an IR camera. FIG. 8 illustrates an image 24 of the IR swatch sheet 23 shown in FIG. 7, but readable with an IR camera 25, in accordance with an embodiment.

Figure 9:
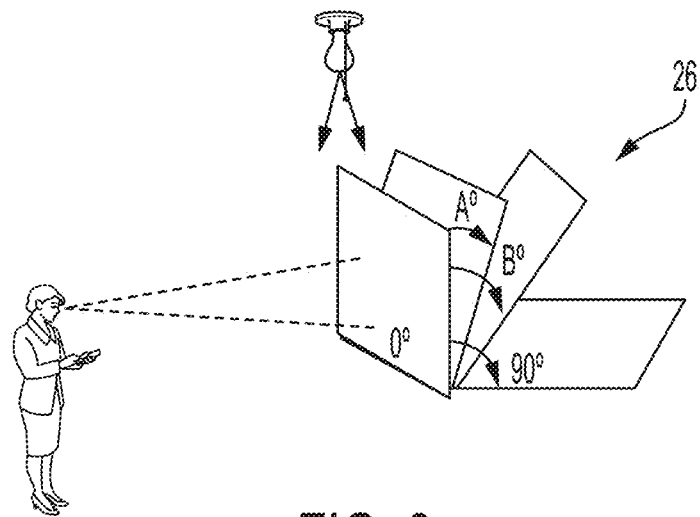
FIG. 9 illustrates a schematic diagram depicting a gloss effect.

The embodiments can also address the gloss effect. That is, a goal in the design of a gloss effect is to provide for a gloss effect that appears to be about the same color/pattern at one angle under illumination while text and/or graphics appear at a different angle. FIG. 9 illustrates a schematic diagram 26 depicting a gloss effect. The schematic diagram 26 shown in FIG. 9 demonstrates that the gloss effect can be based on the angles of the light source, observer, and sample angle. This is true for MicroGloss and other gloss effects such as GlossMark®. In some MicroGlass applications, an IR watermark may be embedded in MicroGlass printing, which involves overlapping IR and MicroGlass effects. These distinct watermarks, however, tend to use more 'real estate'.

An embodiment for addressing this problem can be implemented as a method that can involve the following steps:
1) Define one color CMYK low that of a particular LAB value with a relatively lower toner stack and a relatively high reflectance in the IR spectrum
2) Define another color CMYK high that of a particular LAB value with a relatively higher toner stack and a relatively low reflectance in the IR spectrum
3) Print at small sizes so the two patterns appear as a single LAB color
4) Verify both a MicroGloss effect and IR effect work.

Step 1 and Step 2 above can involve operations that can define a first color pattern having a CMYK value derived from a particular LAB value with a lower toner stack and a higher reflectance in an infrared spectrum as compared to a second color pattern having a second CMYK value derived from the same LAB value. This is because for one particular LAB value there are multiple CMYK values and since it is the same LAB, they should appear about the same color. One CMYK value has a higher toner stack and higher reflectance in IR as compared to the other CMYK value.

Figure 14:
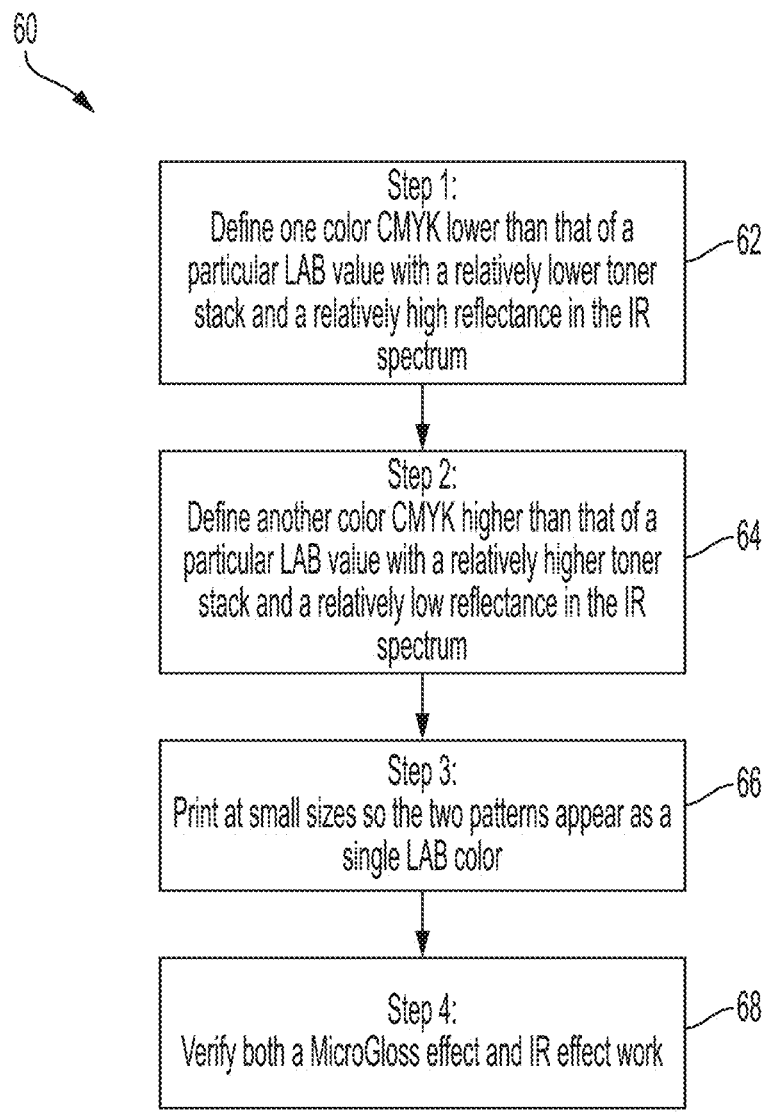
FIG. 14 illustrates a flow chart of operations depicting logical operational steps of a method for implementing a dual microgloss and infrared effects in the same space, in accordance with an embodiment.

The method outlined above with respect to step 1, step 2, step 3, and step 4 is also described herein with respect to the embodiment shown in FIG. 14. Note that the method described above and elsewhere herein can be implemented by a printing system such as the printing system shown 100 shown in FIG. 16.

Figure 10:
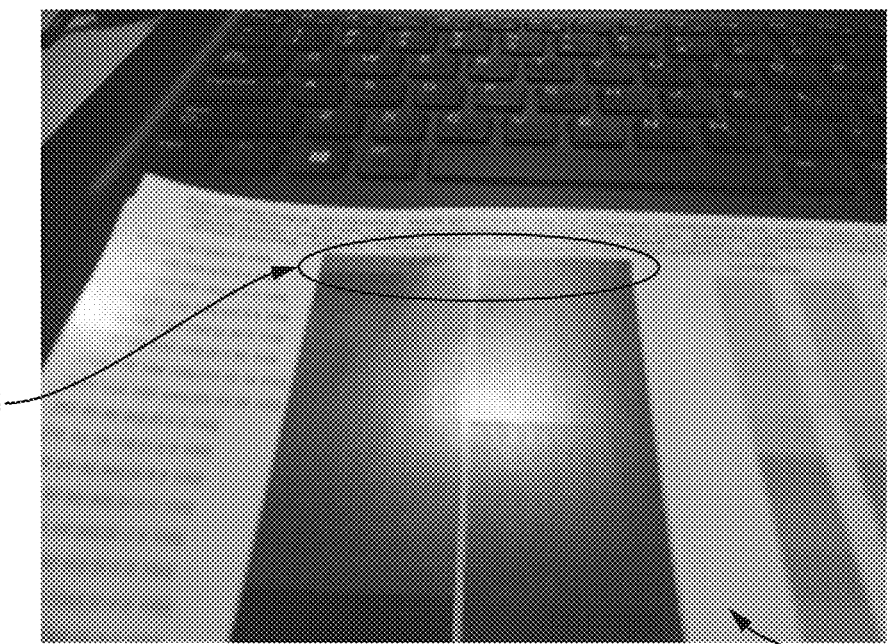
FIG. 10 illustrates an image of a swatch sheet in which not all swatches may work.

FIG. 10 illustrates an image 28 of a swatch sheet 31 in which not all swatches may work. That is, the top line 33 (which may displayed in red and black in a color rendering) shown in the image 28 of FIG. 10 is a sample. The second line down may appear as a single color, or the watermark text may be mostly not visible.

Figure 11:
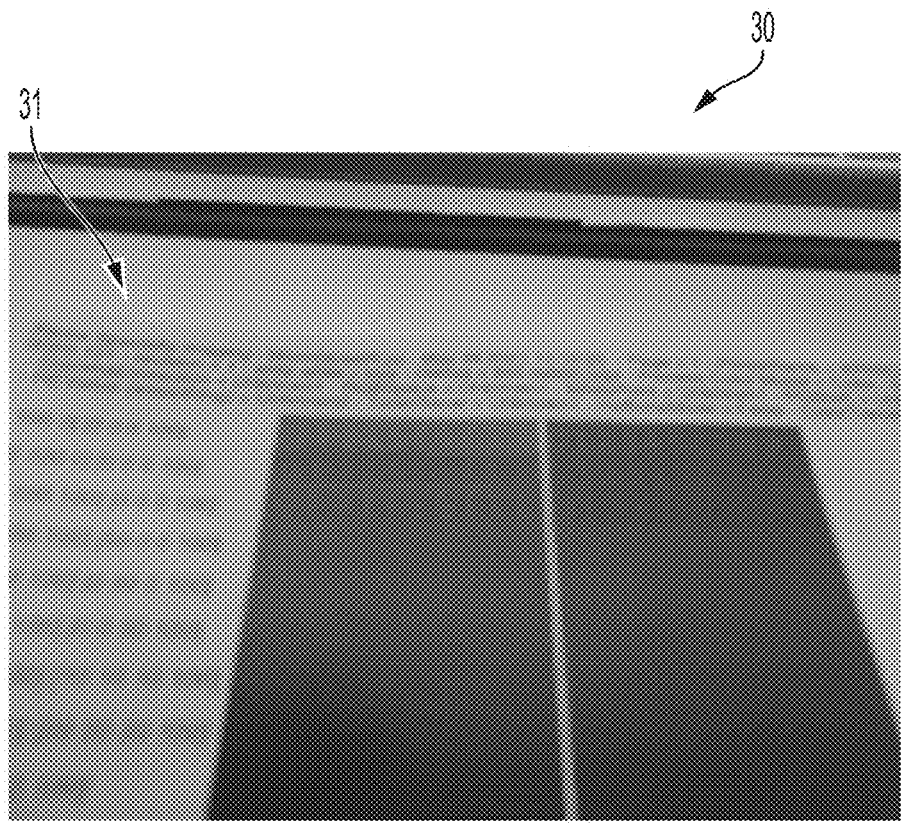
FIG. 11 illustrates an image of the same paper shown in FIG. 10, but at a different angle.

FIG. 11 illustrates an image 30 of the same paper/media 31 shown in FIG. 10, but at a different angle. In the image 30 of the paper/media 31 depicted in FIG. 11, the watermark text "0123456789" is clearly visible as a gloss effect in the second swatch from the top.

Figure 12:
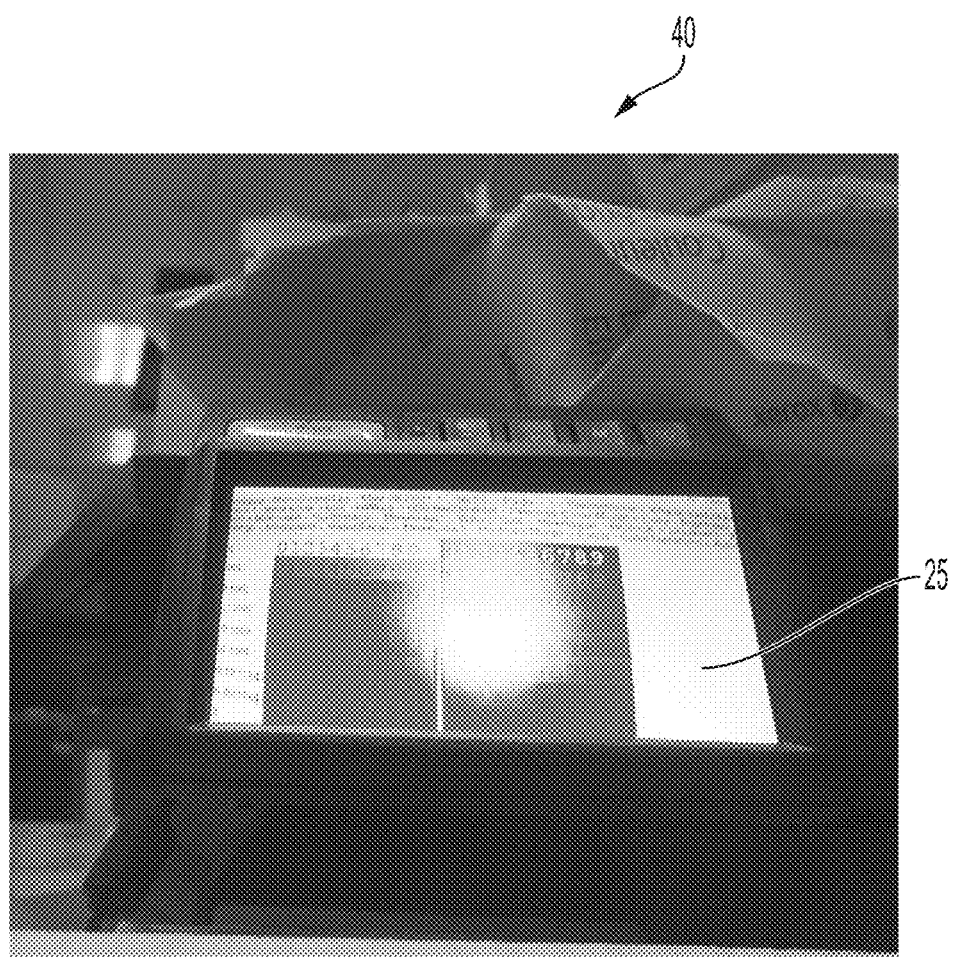
FIG. 12 illustrates an image of the same piece of paper depicted in FIG. 11 but readable with an IR camera.

FIG. 12 illustrates an image 40 of the same piece of paper/media 31 (or substrate) depicted in FIG. 11, but readable with the IR camera 25. Note that the paper/media 31 can be displayed through the IR camera 25. In FIG. 12, the third part of the working dual watermark is the second swatch from the top and has a visible IR watermark. While gloss effects are easy to verify without any equipment, IR effects are better for automatic machine verification e.g., an IR barcode.

Figure 13:
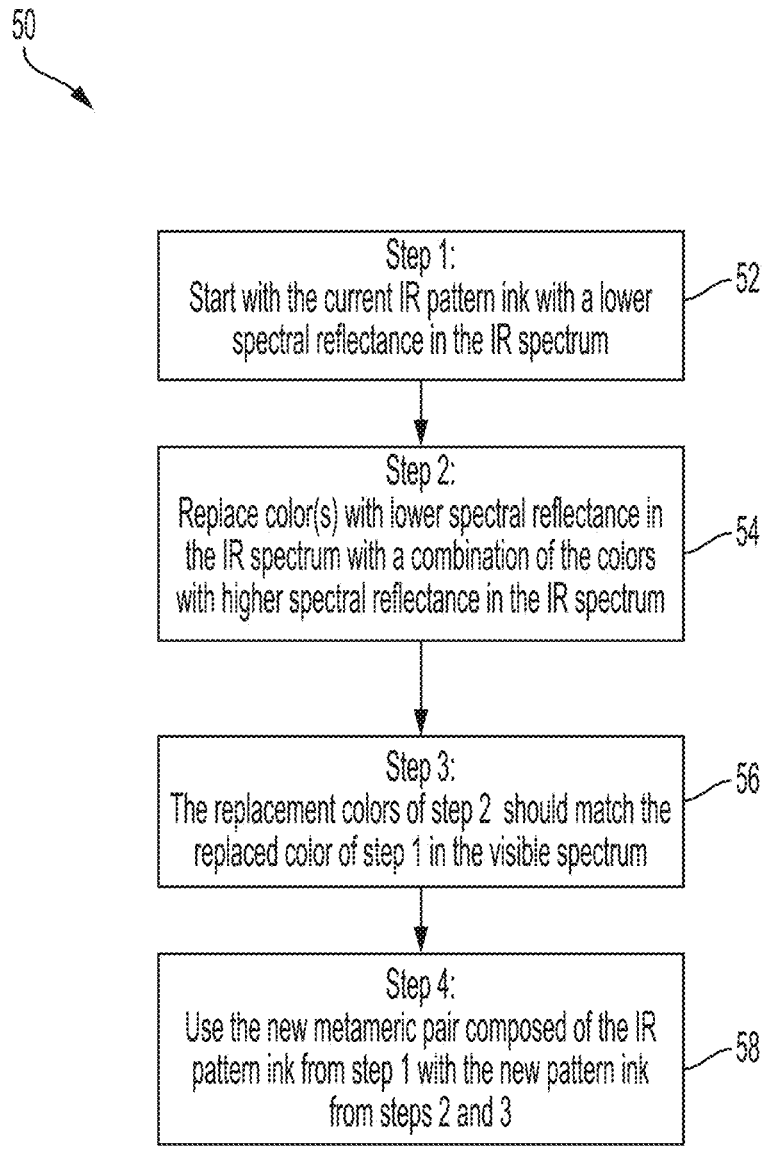
FIG. 13 illustrates a flow chart of operations depicting logical operational steps of a method for implementing near perfect IR colors, in accordance with an embodiment.

FIG. 13 illustrates a flow chart of operations depicting logical operational steps of a method 50 for implementing near perfect IR colors, in accordance with an embodiment. The method 50 depicted in FIG. 13 is shown in the context of four operational blocks including block 52, block 54, block 56, and block 58. Block 52 depicts Step 1, block 54 depicts Step 2, block 54 illustrates Step 3, and block 56 describes Step 4. As shown at block 52, a step or operation can be implemented to begin with a current IR pattern ink with a lower spectral reflectance in the IR spectrum. As depicted at block 54, a step or operation can be implemented to replace the color(s) with a lower spectral reflectance in the IR spectrum with a combination of colors with higher spectral reflectance in the IR spectrum. Then, as indicated at block 54, a step or operation can be implemented in which the replacement colors of Step 2 should match the replaced color of Step 1 in the visible spectrum. Thereafter, as shown at block 56, a step or operation can be implemented to use the new metameric pair consisting of the IR pattern ink from Step 1 with the new pattern ink from Step 2 and Step 3.

The method 50 shown in FIG. 13 can involve operations in which the pattern ink from the original metameric pair that is more absorbent in the IR spectrum can be left unchanged. A second pattern ink can be created from the first pattern ink replacing highly IR absorbent colors with highly reflective IR colors. The new pair of metameric pattern inks now appears almost identical under office lighting while still exhibiting a clearly visible signal with an IR camera (e.g., such as the IR camera 25). More of the swatch sheet is typically now usable. The new set of colors are a direct replacement for the originals.

In method 50 of FIG. 13, the new pattern ink in Steps 2 and 3 and the one chosen in Step 1 become the new IR colors. The original IR pattern ink not chosen in Step 1 is no longer used. Note that the method 50 described above and elsewhere herein can be implemented by a printing system such as the printing system shown 100 shown in FIG. 16.

FIG. 14 illustrates a flow chart of operations depicting logical operational steps of a method 60 for implementing a dual microgloss and infrared effects in the same space, in accordance with an embodiment. As shown at block 62, a step or operation can be implemented to define one color CMYK lower than that of a particular LAB value with a relatively lower toner stack and a relatively high reflectance in the IR spectrum. Then, as depicted at block 64, a step or operation can be implemented to define another color CMYK higher than that of a particular LAB value with a relatively higher toner stack and a relatively low reflectance in the IR spectrum. Then, as shown at block 66, a step or operation can be implemented to print at small sizes, so the two patterns can appear as a single LAB color. Thereafter, as illustrated at block 68, a step or operation can be implemented to verify that a MicroGloss effect and IR effect work.

The method 60 illustrated in FIG. 14 thus can involve steps or operations in which a metameric pair of inks can be created with one that absorbs more infrared light than the other. In addition, one ink can be made from a higher toner or ink stack as compared to the other. Printing at small sizes the two inks appear around the same or appear as a single color. A gloss effect can be observed when tilting under a light and an infrared mark is visible with an IR camera. Both effects appear in the same space saving valuable real estate.

Figure 16:
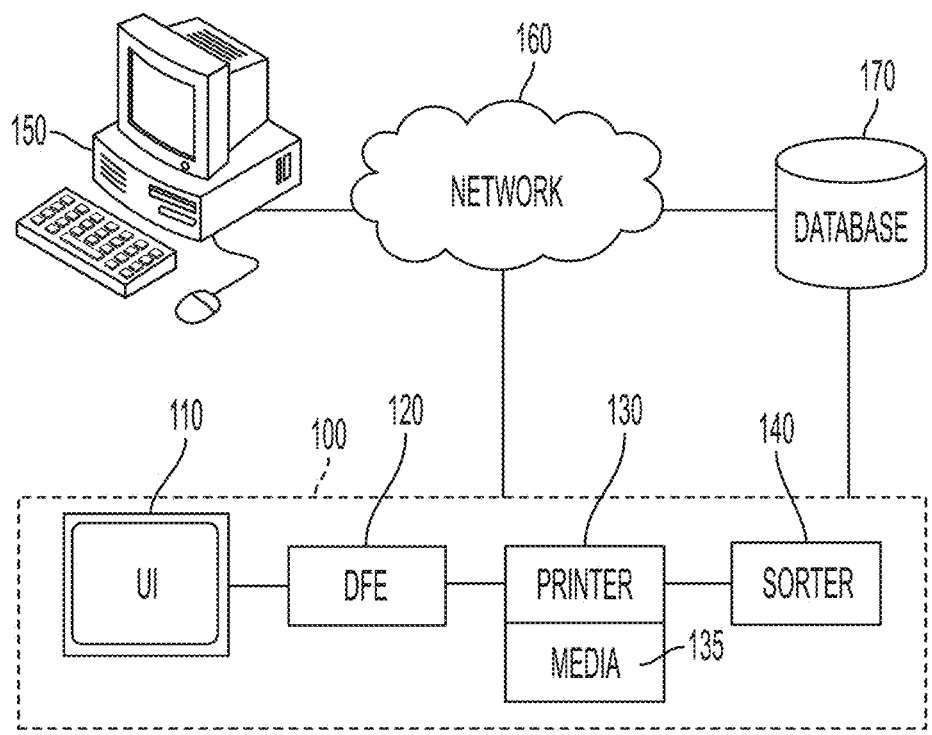
FIG. 16 illustrates a block diagram of digital front-end controller useful for implementing one or more aspects of the exemplary methods described herein.

Note that the method 60 described above and elsewhere herein can be implemented by a printing system such as the printing system shown 100 shown in FIG. 16.

Figure 15:
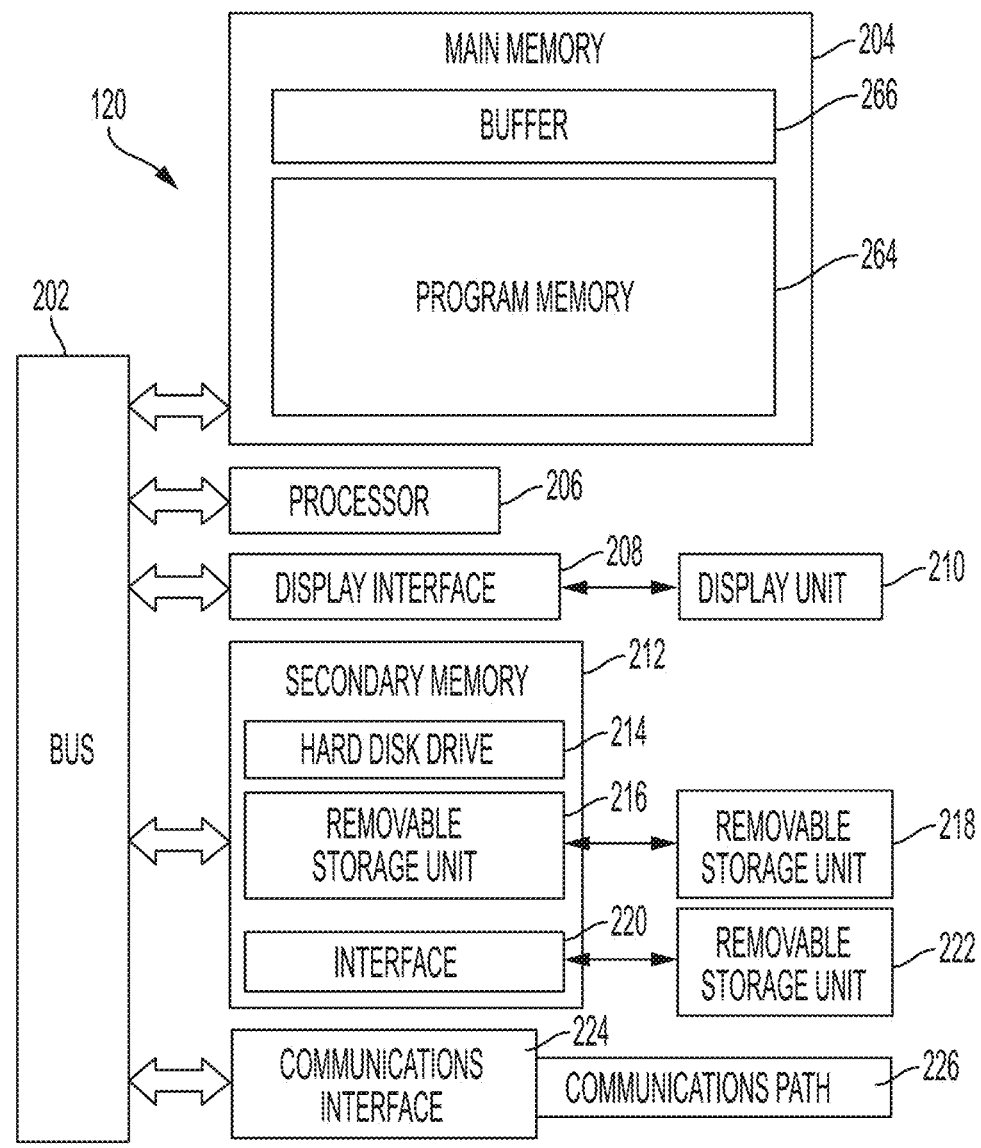
FIG. 15 illustrates a block diagram of a digital front-end controller of a printing system suitable for implementing one or more aspects of the exemplary methods described herein.

FIG. 15 illustrates a block diagram of a digital front-end (DFE) controller 120 useful for implementing one or more aspects of the exemplary methods described herein. With respect to FIG. 15, an exemplary digital front-end controller 120 is shown in greater detail. The digital front-end controller 120 can include one or more processors, such as processor 206 capable of executing machine executable program instructions.

Note that the term digital front-end (DEF) as utilized herein can relate to a workflow touchpoint that can accept a print file (e.g., a pdf or PostScript file) and can turn the print file into a format that a print engine (e.g., toner or inkjet) can use to lay down the content on a substrate (e.g., print media, etc.). In an embodiment, a DFE can be a raster image processor (RIP) but may include much more depending on the type of device/system in which the DFE is implemented. A DFE controller thus can comprise a device, program, and/or system for controlling the DFE of a printing system.

In the embodiment shown in FIG. 15, the processor 206 can communicate with a bus 202 (e.g., a backplane interface bus, cross-over bar, or data network, etc.). The digital front-end controller 120 also can include a main memory 204 that can store machine-readable instructions. The main memory 204 is thus capable of storing data. The main memory 204 may alternatively include random access memory (RAM) to support reprogramming and flexible data storage. A buffer 266 can be used to temporarily store data for access by the processor. The main memory 204 can also include a program memory 264 that can comprise, for example, executable programs that can implement one or more of the embodiments of the methods described herein. The program memory 264 can store at least a subset of the data contained in the buffer 266.

The digital front-end controller 120 can include a display interface 208 that can forward data from the communication bus 202 (or from a frame buffer not shown) to a display 210. The digital front-end controller 120 also can comprise a secondary memory 212, which may include, for example, a hard disk drive 214 and/or a removable storage drive 216, which can read and write data to removable storage 218, such as a floppy disk, magnetic tape, optical disk, etc., that can store computer software and/or data.

The secondary memory 212 alternatively can include other similar mechanisms for allowing computer programs or other instructions to be loaded into the computer system. Such mechanisms can include, for example, a removable storage unit 222 adapted to exchange data through an interface 220.

Examples of such mechanisms include a program cartridge and cartridge interface (such as that found in video game devices), a removable memory chip (such as an EPROM or PROM) and associated socket, and other removable units and interfaces, which allow software and data to be transferred.

The digital front-end controller 120 can include a communications interface 224, which can act as both input and output to allow software and data to be transferred between the digital front-end controller 120 and external devices. Examples of a communications interface include a modem, a network interface (such as an Ethernet card), a communications port, a PCMCIA slot and card, etc.

Computer programs (also called computer control logic) may be stored in main memory 204 and/or secondary memory 212. Computer programs may also be received via a communications interface 224, which is associated with a communications path 226. Such computer programs, when executed, can enable the computer system to perform the features and capabilities provided herein such as, for example, the instructions, operations, or steps shown at blocks 52 to 58 in FIG. 13 and/or blocks 62 to 68 depicted in FIG. 14 and described elsewhere herein. Software and data transferred via the communications interface can be in the form of signals which may be, for example, electronic, electromagnetic, optical, or other signals capable of being received by a communications interface.

These signals can be provided to the communications interface 224 via the communications path 226 (i.e., channel), which can carry signals and may be implemented using wire, cable, fiber optic, phone line, cellular link, RF, or other communications channels. Part of the data generally stored in secondary memory 212 for access during digital front-end operation can be a set of translation tables that can convert an incoming color signal into a physical machine signal. This color signal can be expressed either as a colorimetric value, usually three components as L*a*b*, RGB, XYZ, etc., into physical exposure signals for the four toners cyan, magenta, yellow, and black. These tables can be created outside of the digital front-end and downloaded and may be optionally created within the digital front-end in a so-called characterization.

FIG. 16 illustrates a block diagram of a printing system (or image rendering system) 100, which can be suitable for implementing various aspects of the exemplary embodiments described herein. Note that as utilized herein, the word "printer" and the term "printing system" can encompass any apparatus and/or system, such as a digital copier, xerographic and reprographic printing systems, bookmaking machine, facsimile machine, multi-function machine, ink-jet machine, continuous feed, sheet-fed printing device, etc., which may contain a print controller and a print engine, and which may perform a print outputting function for any purpose.

The printing system 100 depicted in FIG. 16 can function in some embodiments as a digital color printing system, and can include a user interface 110, a digital front-end (DFE) controller 120, and a print engine 130 that can access the print media 135 (e.g., substrate(s)) of various sizes and/or costs for a print job. A "print job" or "document" is normally a set of related sheets, usually one or more collated copy sets copied from a set of original print job sheets or electronic document page images, from a particular user, or otherwise related. For submission of a regular print job (or customer job), digital data can be sent to the printing system 100. Note that the DFE controller 120 shown in FIG. 16 can be implemented by the DFE controller 120 illustrated in FIG. 15. That is, the DFE controller 120 shown in FIG. 15 can be incorporated into the printing system 100 shown in FIG. 16.

In an embodiment, a sorter can operate after or with the print engine 130 to manage arrangement of the hard copy output, including cutting functions, facilitating printing/rendering of a job. A user can access and operate the printing system 100 using the user interface 110 or via a data-processing apparatus. The data-processing apparatus can communicate with the printing system 100 via a communications network 160.

A user profile, a work product for printing, a media library, and various print job parameters can be stored in a database or memory 170 accessible by the data-processing apparatus or the printing system 100 via the network 160, or such data can be directly accessed via the printing system 100. One or more color sensors (not shown) may be embedded in the printer paper path, as known in the art.

The claims, description, and drawings of this application may describe one or more of the instant technologies in operational/functional language, for example, as a set of operations to be performed by a computer. Such operational/functional description in most instances can be specifically-configured hardware (e.g., because a general purpose computer in effect becomes a special-purpose computer once it is programmed to perform particular functions pursuant to instructions from program software). Note that the data-processing systems and devices discussed herein may be implemented as a general purpose computer or a special-purpose computer in some embodiments. That is, data-processing systems can be programmed to perform the aforementioned particular instructions thereby becoming in effect a special-purpose computer. In some situations, a printing device or printing system may be a special-purpose computer. Thus, the DFE controller 120 shown in FIG. 15 may be implemented in some embodiments as a special purpose computer or with a special purpose computer. Similarly, in other embodiments, the DFE controller 100 shown in FIG. 16 may be implemented as a special-purpose computer or in association with a special-purpose controller.

Based on the foregoing, it can be appreciated that a number of embodiments including preferred and alternative embodiments are disclosed herein. For example, in one embodiment a method of rendering a watermark with near perfect infrared colors, can involve: providing an infrared pattern ink having a color with a lower spectral reflectance in an infrared spectrum; replacing the color having the lower spectral reflectance in the infrared spectrum with a replacement color comprising a combination of colors having a higher spectral reflectance in the infrared spectrum; matching in a visible spectrum, the replacement color with the color having the lower spectral reflectance in the infrared spectrum; and rendering a watermark comprising a metameric color pair that includes the infrared pattern ink and the replacement color.

In an embodiment, the metameric color pair may comprise a pair of metameric pattern inks.

In an embodiment, the metameric color pair can exhibit a visible signal with an infrared camera.

In an embodiment, the watermark can be rendered by a printing system.

In an embodiment, the processor can comprise a digital front-end (DFE) controller.

In an embodiment, the watermark can be rendered by a printing system and the processor can comprise a digital front-end controller.

In another embodiment, a method for rendering imaging effects on a same space on a recording medium, can involve: defining with a processor, a first color pattern having a CMYK value derived from a particular LAB value with a lower toner stack and a higher reflectance in an infrared spectrum as compared to a second color pattern having a second CMYK value derived from the same LAB value; and rendering at a small size the first color pattern and the second color pattern on a recording medium, wherein the first color pattern and the second color pattern appear as a single LAB color in a same space on the recording medium.

In an embodiment, the first color pattern can comprise one or more of: a microgloss effect or an IR effect.

In an embodiment, the second color pattern can comprise one or more of: a microgloss effect or an IR effect.

In an embodiment, the first color pattern can comprise a microgloss effect and the second color pattern comprises an IR effect.

In an embodiment, the first color pattern can comprise an IR effect and the second color pattern comprises a microgloss effect.

An embodiment can further involve providing a watermark that can include the first color pattern and the second color pattern rendered on the recording medium.

In an embodiment, the first color pattern and the second color pattern can be rendered on a recording medium by a printing system.

In another embodiment, a printing system for rendering a watermark with near perfect infrared colors, can include a processor adapted to: provide an infrared pattern ink having a color with a lower spectral reflectance in an infrared spectrum; replace the color having the lower spectral reflectance in the infrared spectrum with a replacement color comprising a combination of colors having a higher spectral reflectance in the infrared spectrum; and match in a visible spectrum, the replacement color with the color having the lower spectral reflectance in the infrared spectrum.

In an embodiment, the printing system can include a printer that is operable to render a watermark comprising a metameric color pair that can include the infrared pattern ink and the replacement color.

In an embodiment of the printing system, the metameric color pair can include a pair of metameric pattern inks.

In an embodiment of the printing system, the metameric color pair can exhibit a visible signal with an infrared camera.

In an embodiment of the printing system, the metameric color pair comprises a pair of metameric pattern inks and the metameric color pair can exhibit a visible signal with an infrared camera.

An embodiment of the printing system can include a digital front-end controller.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method of rendering a watermark with near perfect infrared colors, comprising:
    providing an infrared pattern ink having a color with a lower spectral reflectance in an infrared spectrum;
    replacing the color having the lower spectral reflectance in the infrared spectrum with a replacement color comprising a combination of colors having a higher spectral reflectance in the infrared spectrum;
    matching in a visible spectrum, the replacement color with the color having the lower spectral reflectance in the infrared spectrum; and
    rendering a watermark that is device-independent, the watermark comprising a metameric color pair that includes the infrared pattern ink and the replacement color.

2. The method of claim 1 wherein the metameric color pair comprises a pair of metameric pattern inks.

3. The method of claim 1 wherein the metameric color pair exhibits a visible signal with an infrared camera.

4. The method of claim 1 wherein the watermark is rendered by a printing system.

5. The method of claim 1 wherein the processor comprises a digital front-end controller.

6. The method of claim 1 wherein the watermark is rendered by a printing system and the processor comprises a digital front-end controller.

7. A printing system for rendering a watermark with near perfect infrared colors, comprising:
    a processor adapted to:
        provide an infrared pattern ink having a color with a lower spectral reflectance in an infrared spectrum;
        replace the color having the lower spectral reflectance in the infrared spectrum with a replacement color comprising a combination of colors having a higher spectral reflectance in the infrared spectrum; and
        match in a visible spectrum, the replacement color with the color having the lower spectral reflectance in the infrared spectrum.

8. The printing system of claim 7 further comprising a printer that renders a watermark comprising a metameric color pair that includes the infrared pattern ink and the replacement color.

9. The printing system of claim 8 wherein the metameric color pair comprises a pair of metameric pattern inks.

10. The printing system of claim 8 wherein:
    the metameric color pair comprises a pair of metameric pattern inks; and
    the metameric color pair exhibits a visible signal with an infrared camera.

11. The printing system of claim 8 wherein the metameric color pair exhibits a visible signal with an infrared camera.

12. The printing system of claim 7 wherein the processor comprises a digital front-end controller.

* * * * *